United States Patent
Onchi

(10) Patent No.: US 10,882,120 B2
(45) Date of Patent: Jan. 5, 2021

(54) CUTTING TOOL AND METHOD OF MANUFACTURING MACHINED PRODUCT

(71) Applicant: Kyocera Corporation, Kyoto (JP)

(72) Inventor: Suguru Onchi, Omihachiman (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/345,257

(22) PCT Filed: Oct. 23, 2017

(86) PCT No.: PCT/JP2017/038195
§ 371 (c)(1),
(2) Date: Apr. 26, 2019

(87) PCT Pub. No.: WO2018/079489
PCT Pub. Date: May 3, 2018

(65) Prior Publication Data
US 2019/0291189 A1    Sep. 26, 2019

(30) Foreign Application Priority Data
Oct. 26, 2016 (JP) ................................. 2016-209614

(51) Int. Cl.
*B23B 51/02* (2006.01)

(52) U.S. Cl.
CPC .......... *B23B 51/02* (2013.01); *B23B 2251/18* (2013.01); *B23B 2251/40* (2013.01)

(58) Field of Classification Search
CPC ............... B23B 51/02; B23B 2251/14; B23B 2251/202; B23B 2251/18; Y10T 408/9097; Y10T 408/909
See application file for complete search history.

(56) References Cited

U.S. PATENT DOCUMENTS

| | | | | |
|---|---|---|---|---|
| 4,983,079 A | * | 1/1991 | Imanaga | B23B 51/02 408/144 |
| 5,716,172 A | * | 2/1998 | Nakamura | B23B 51/02 408/230 |
| 6,916,139 B2 | * | 7/2005 | Yanagida | B23B 51/02 408/227 |

(Continued)

FOREIGN PATENT DOCUMENTS

| | | |
|---|---|---|
| JP | 2004268230 A | 9/2004 |
| JP | 2004338032 A | 12/2004 |
| JP | 6711830 B2 | 6/2020 |

*Primary Examiner* — Nicole N Ramos
(74) *Attorney, Agent, or Firm* — Viering, Jentschura & Partner MBB

(57) ABSTRACT

A cutting tool may include a body, a cutting edge, and a flute. The body may include a rotation axis and extend from a first end to a second end. The cutting edge may be located at the first end. The flute spirally may extend from the cutting edge toward a side of the second end. The cutting edge may include a first cutting edge and a second cutting edge extending from the first cutting edge toward an outer peripheral surface of the body in a front view. The flute may include a first thinning portion located continuously with the first cutting edge at a side of the first end, and a second thinning portion located continuously with the second cutting edge at a side of the first end. A thinning angle of the first thinning portion may be smaller than a thinning angle of the second thinning portion.

8 Claims, 11 Drawing Sheets

(56) References Cited

U.S. PATENT DOCUMENTS

| | | | |
|---|---|---|---|
| 8,858,134 B2 * | 10/2014 | Glimpel | B23B 51/02 408/230 |
| 2008/0089753 A1 * | 4/2008 | Takikawa | B23B 51/02 408/230 |
| 2012/0076597 A1 * | 3/2012 | Krenzer | B23B 51/02 408/227 |
| 2016/0214184 A1 * | 7/2016 | Krenzer | B23B 51/02 |
| 2018/0043441 A1 * | 2/2018 | Fujiwara | B23B 51/02 |
| 2018/0243840 A1 | 8/2018 | Ogawa | |

* cited by examiner

US 10,882,120 B2

CUTTING TOOL AND METHOD OF MANUFACTURING MACHINED PRODUCT

CROSS-REFERENCE TO RELATED APPLICATIONS

This application is a national stage entry according to 35 U.S.C. 371 of PCT Application No. PCT/JP2017/038195 filed on Oct. 23, 2017, which claims priority to Japanese Application No. 2016-209614 filed on Oct. 26, 2016, which are entirely incorporated herein by reference.

TECHNICAL FIELD

The present disclosure relates to rotary tools, such as end mills and drills, for use in a milling process.

BACKGROUND

As a rotary tool used for the milling process, drills have been discussed, for example, in Japanese Unexamined Patent Publication No. 2004-338032 (Patent document 1) and Japanese Unexamined Patent Publication No. 2004-268230 (Patent document 2). The drills described in Patent documents 1 and 2 may include a thinning part continuous with a side of an inner peripheral end of a cutting edge.

Because a cutting speed on the side of the inner peripheral end of the cutting edge is lower than that on a side of an outer peripheral end thereof, a chip flow direction tends to become unstable. Specifically, the drill described in Patent document 1 has a large inclination angle (through angle) relative to a rotation axis, which indicates an extending direction of the thinning part. Therefore, chips flowing through the thinning part tend to flow to a side of an outer periphery. This may cause a winding scratch on a surface located around a drilled hole in a workpiece formed by the drill (hereinafter referred to as a machined surface for the sake of convenience).

SUMMARY

In a non-limiting aspect, a cutting tool may include a body having a bar-shape, a cutting edge and a flute. The body may include a rotation axis and extend from a first end to a second end. The cutting edge may be located at the first end of the body. The flute may spirally extend from the cutting edge toward a side of the second end of the body. The cutting edge may include a first cutting edge that intersects with the rotation axis in a front view and a second cutting edge extending from the first cutting edge toward an outer peripheral surface of the body. The flute may include a first thinning portion located continuously with the first cutting edge at a side of the first end, and a second thinning portion located continuously with the second cutting edge at a side of the first end. A thinning angle of the first thinning portion may be smaller than a thinning angle of the second thinning portion.

DETAILED DESCRIPTION

<Cutting Insert>

Figure 1:
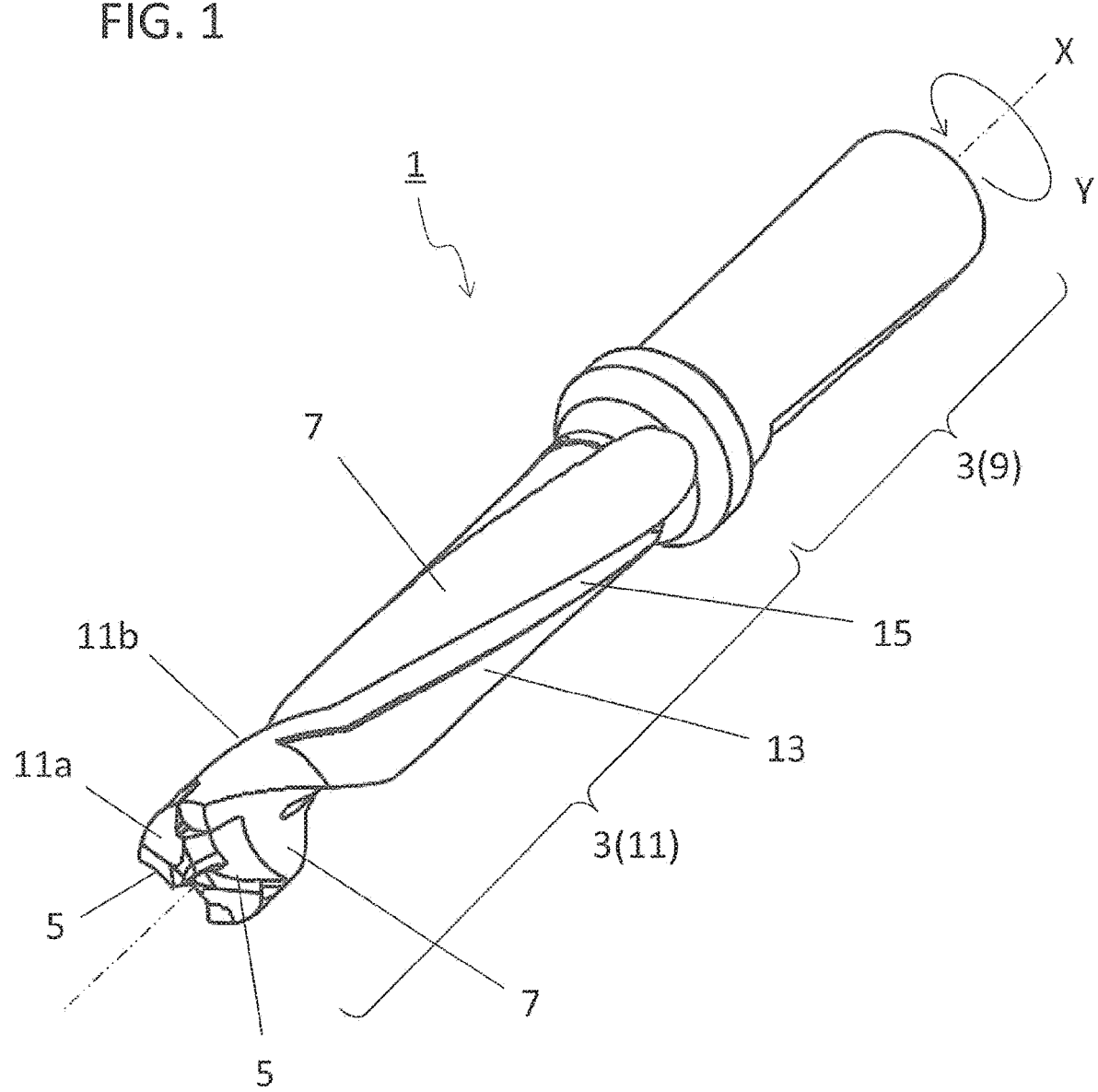
FIG. 1 is a perspective view illustrating a cutting tool (drill) in a non-limiting aspect.

A cutting tool 1 in a non-limiting aspect is described in detail below with reference to the drawings. For the sake of description, each of the drawings referred to in the following illustrates, in a simplified form, only main members necessary for describing the non-limiting aspect. Hence, the cutting tool 1 disclosed in the following is capable of including any arbitrary structural member not illustrated in the drawings referred to. Dimensions of the members in each of the drawings do not faithfully represent dimensions of actual structural members and dimension ratios of these members.

<Drill>

The cutting tool 1 in a non-limiting aspect may be a drill that is an embodiment of rotary tools. Examples of the rotary tools may include end mills besides drills.

The drill 1 in a non-limiting aspect illustrated in FIG. 1 may include a body 3 having a bar-shape and extending from a first end to a second end, a cutting edge 5 located at the first end of the body 3, and a flute 7 spirally extending from the cutting edge 5 toward a side of the second end.

The body 3 may be a body having a bar-shape, including a rotation axis X and extending along the rotation axis X. The body 3 may rotate about the rotation axis X during a cutting process of a workpiece in order to manufacture a machined product. Hereinafter, the first end may be referred to as a front end, and the second end may be referred to as a rear end. A side closer to the rotation axis X may be referred to as a side of the rotation axis X, and a side farther from the rotation axis X may be referred to a side of an outer peripheral surface. A direction directed from the rear end of the body 3 toward the front end thereof may be referred to as a front end direction, and a direction directed from a front end of the body 3 toward the rear end thereof may be referred to as a rear end direction.

The body 3 in a non-limiting aspect illustrated in FIG. 1 may include a holding part 9 and a cutting part 11. The holding part 9 may be a part which is designed to be held by, for example, a spindle being rotated in a machine tool, and may be designed according to a shape of the spindle or the like in the machine tool. The cutting part 11 may be located at a side of the front end relative to the holding part 9. The cutting part 11 may be a part including a portion brought into contact with a workpiece, and may have a major role in the cutting process of the workpiece. An arrow Y in FIG. 1 and the like indicates a rotation direction of the body 3 about the rotation axis X.

The cutting part 11 may be constituted by a single member or a plurality of members. If the cutting part 11 is constituted by the single member, the drill is generally called a solid drill. The cutting part 11 in a non-limiting aspect illustrated in FIG. 1 may be constituted by a first member 11a located at a side of the front end, and a second member 11b located at a side of the rear end. In case, the cutting part is constituted by the plurality of members and the first member 11a at the side of the front end is replaceable, the drill may be generally called an indexable drill. In this case, the first part 11a may be generally called an indexable insert (insert).

The cutting part 11 may have, for example, a shape obtained by removing parts corresponding to the flute 7 and a clearance 13 from a circular columnar body extending along the rotation axis X as illustrated in FIG. 1. Accordingly, parts corresponding to a margin 15 and the like, except for the flute 7 and the clearance 13 on an outer periphery of the cutting part 11, may have a circular arc shape located on an identical circle in a cross section orthogonal to the rotation axis X. A diameter of the identical circle may correspond to an outer diameter of the cutting part 11.

Although the drill 1 is not limited to one which has a specific size, the outer diameter of the cutting part 11 may be set to, for example, 6-42.5 mm. Alternatively, the drill 1 may be set to, for example, in a range of L=3D to L=12D where L is a length of an axial line (length of the cutting part 11) and D is a diameter (outer diameter of the cutting part 11).

As a material of the body 3, there are, for example, cemented carbide containing WC (tungsten carbide) and containing Co (cobalt) as a binder, alloys obtained by adding additives such as TiC (titanium carbide) or TaC (tantalum carbide) to the cemented carbide, and metals such as stainless steel and titanium.

The drill 1 may include the cutting edge 5 located at a front end of the first member 11a. The first member 11a in a non-limiting aspect illustrated in FIG. 1 may be located at a side of the front end of the cutting part 11. In other words, the cutting edge 5 may be located at the front end of the body 3. The cutting edge 5 may be usable as a portion for cutting out a workpiece. The cutting edge 5 in a non-limiting aspect illustrated in FIG. 2 or the like may be constituted by a first cutting 17 and a second cutting edge 19. The first cutting edge 17 may intersect with the rotation axis X in a front view. The second cutting edge 19 may be located at a side of an outer peripheral surface with respect to the first cutting edge 17. In other words, the second cutting edge 19 may extend from the first cutting edge 17 toward the outer peripheral surface of the body 3.

The first cutting edge 17 may intersect with the rotation axis X and may be capable of functioning as a so-called chisel edge. The term "chisel edge" may denote a region of the cutting edge 5 whose rake angle has a negative value. The region may function to crush a workpiece rather than cutting out the workpiece. There is no problem even if the cutting edge 5 is configured to include only one second cutting edge 19. Alternatively, the cutting edge 5 may include two second cutting edges 19 as in a non-limiting aspect illustrated in FIG. 2. These two second cutting edges 19 may be respectively continuous with an end portion of the first cutting edge 17, and may have rotational symmetry of 180° about the rotation axis X.

The flute 7 may be located from the cutting edge 5 toward a side of the rear end of the body 3 on an outer periphery of the cutting part 11 in the body 3 as illustrated in FIG. 1. The flute 7 may be usable for discharging chips generated by the cutting edge 5 to the outside. The flute 7 in a non-limiting aspect illustrated in FIG. 1 may extend spirally about the rotation axis X. Because the drill 1 in a non-limiting aspect illustrated in FIG. 1 may include the two second cutting edges 19, the drill 1 may include two flutes 7 instead of only one.

A helix angle of the spirally extending flutes 7 may be constant from a side of the front end to a side of the rear end, or alternatively, may be changed midway. The term "helix angle" may denote an angle formed by a leading edge and an imaginary straight line parallel to the rotation axis X. The leading edge may be indicated by an intersection line formed by the flute 7 and the margin 15 located backward in a rotation direction Y of the rotation axis X with respect to the flute 7. The helix angle may be set to, for example, approximately 3-45°.

Figure 2:
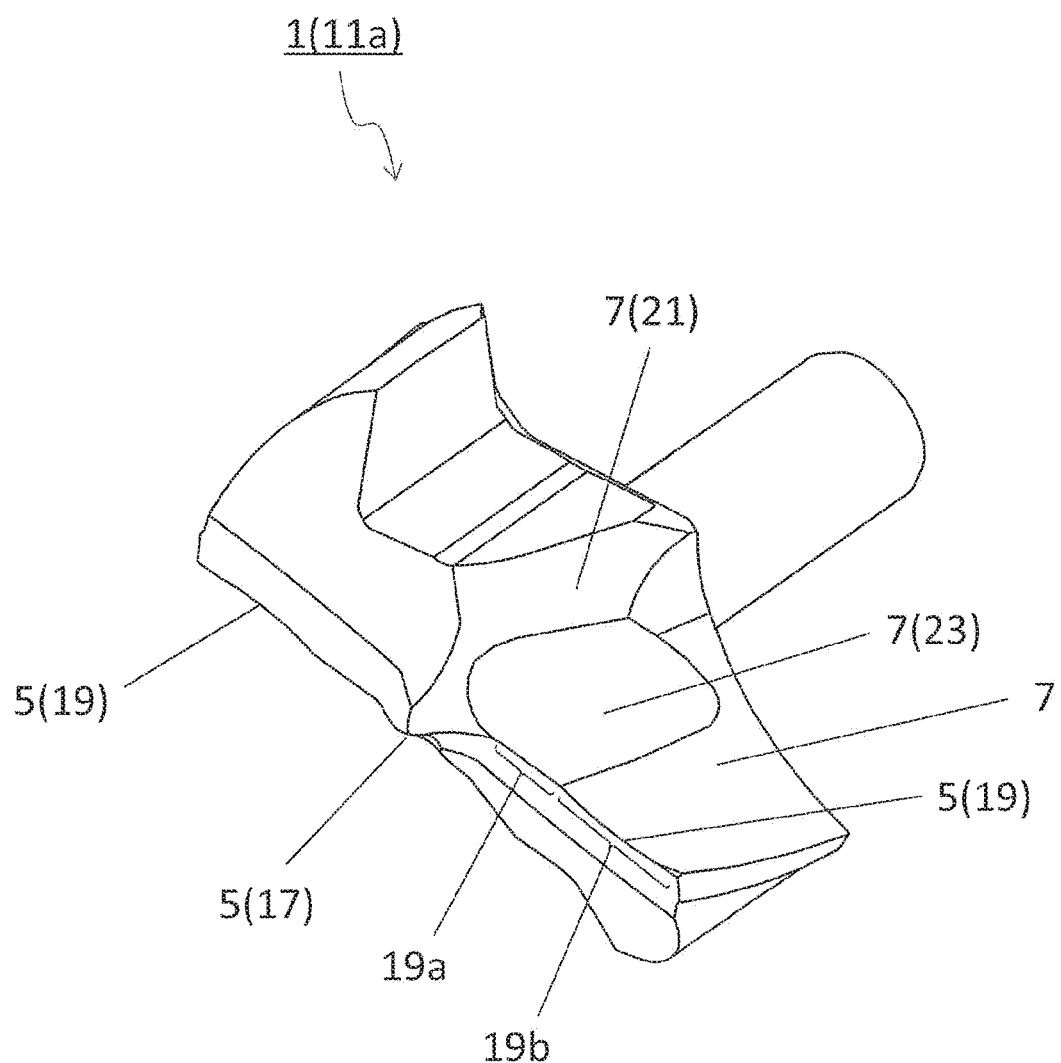
FIG. 2 is a perspective view illustrating a first member (indexable insert) in FIG. 1.

The flute 7 in a non-limiting aspect illustrated in FIG. 2 may include a first thinning portion 21 located continuously with the first cutting edge 17 at a side of the front end, and a second thinning portion 23 located continuously with the second cutting edge 19 at a side of the front end. If referring to both of the first thinning portion 21 and the second thinning portion 23, both may be collectively called the thinning part.

The first thinning portion 21 and the second thinning portion 23 may be mainly aimed at reducing cutting resistance during a cutting process. No particular limitations are placed on shape of the first thinning portion 21 and the second thinning portion 23. For example, both may have a flat surface shape or may partially have a curved surface shape.

A thinning angle (hereinafter also referred to simply as a through angle) $\theta 1$ of the first thinning portion 21 may be smaller than a through angle $\theta 2$ of the second thinning portion 23 in a side view. Because the first cutting edge 17 is located so as to intersect with the rotation axis X in a front view, the first cutting edge 17 is located more inward than the second cutting edge 19. Accordingly, a cutting speed of the first cutting edge 17 may be lower than a cutting speed of the second cutting edge 19 during the cutting process. A chip flow occurred on the first cutting edge 17 may be slower than a chip flow occurred on the second cutting edge 19, and may be therefore susceptible to influence of the through angle of the thinning part. Consequently, chips may tend to flow in a direction inclined due to the through angle.

The term "thinning angle" may denote an angle formed by the rotation axis X of the drill 1 and a heel surface of the thinning part. The term "heel surface" may denote a surface of the thinning part which is located forward in the rotation direction Y. The through angle may be therefore evaluable by an angle formed by the rotation axis X and the heel surface of the thinning part in a side view of the drill 1 taken from a direction that is orthogonal to the rotation axis X and parallel to the heel surface.

Figure 6:
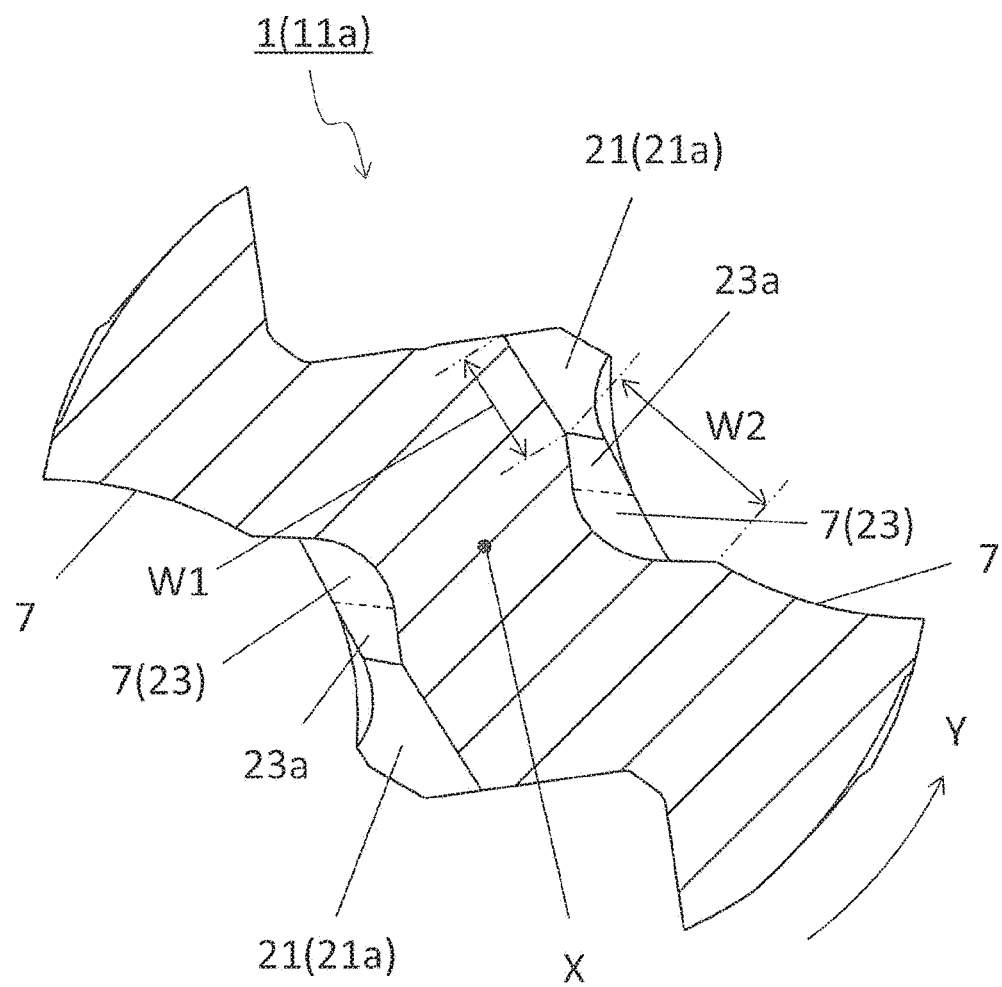
FIG. 6 is a sectional view taken along line B1-B1 in the first member illustrated in FIG. 5.
Figure 7:
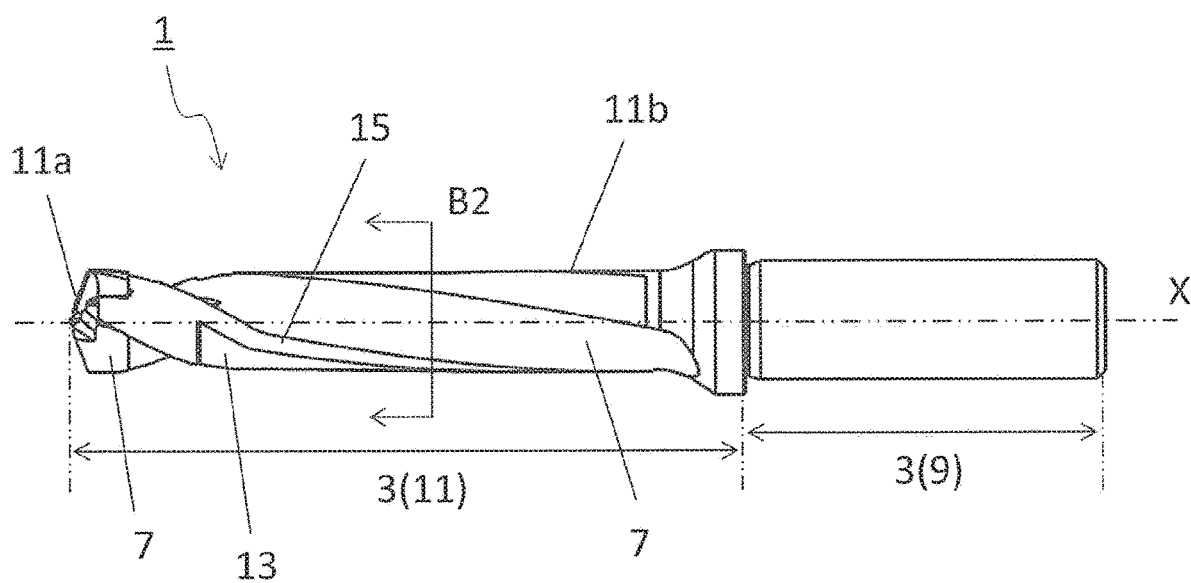
FIG. 7 is a side view of the cutting tool illustrated in FIG. 1.

In a non-limiting aspect illustrated in FIG. 6, the first thinning portion 21 extending from the first cutting edge 17 may include a flat portion 21a located at a side of a rear end in the first thinning portion 21. The portion 21a may serve as the heel surface. A through angle $\theta 1$ of the first thinning portion 21 in a non-limiting aspect illustrated in FIG. 4 may be therefore evaluable by an angle formed by the rotation axis X and the portion 21a in a side view of the drill 1 taken from a direction parallel to the portion 21a.

In a non-limiting aspect illustrated in FIG. 6, the second thinning portion 23 extending from the second cutting edge 19 may include a flat portion 23a located forward in the rotation direction Y. A through angle θ2 of the second thinning portion 23 in a non-limiting aspect illustrated in FIG. 5 may be therefore evaluable by an angle formed by the rotation axis X and the portion 23a in a side view of the drill 1 taken from a direction parallel to the flat portion 23a at a side of the heel.

Figure 4:
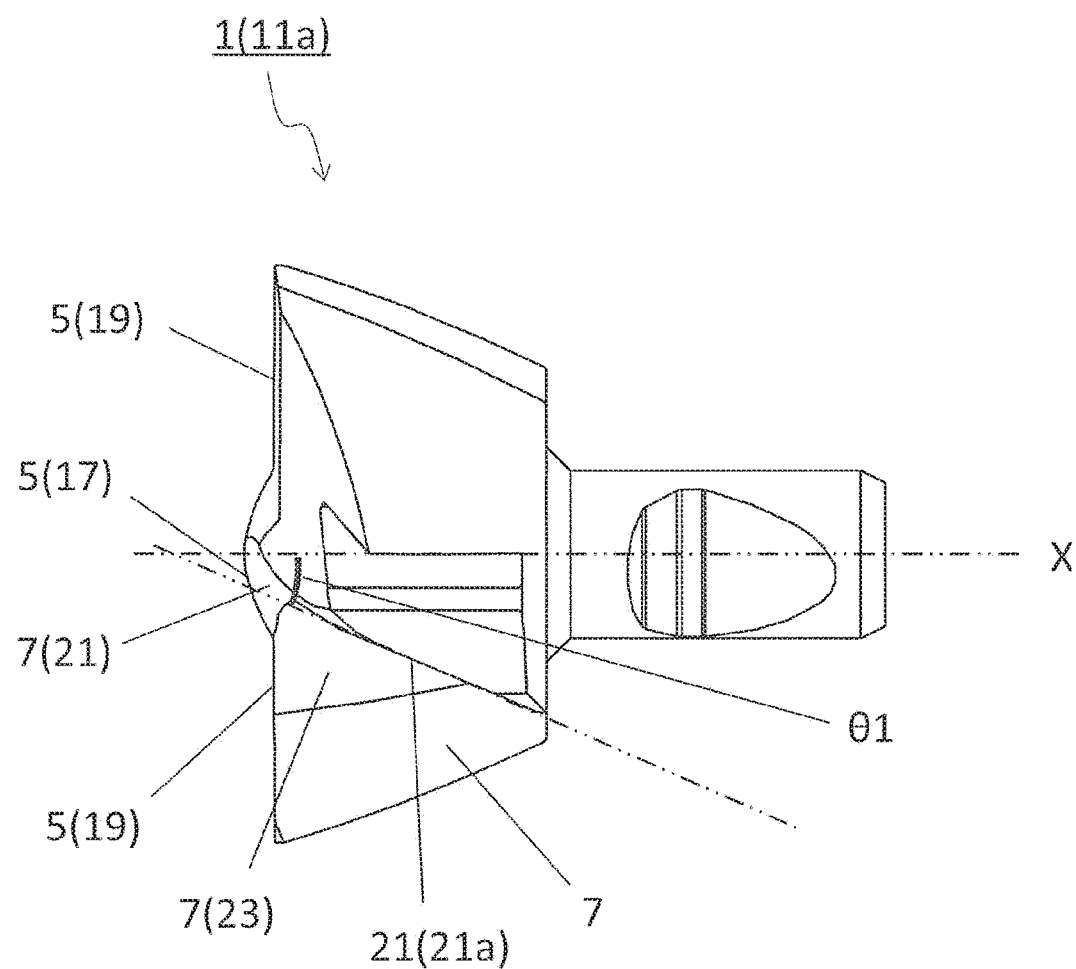
FIG. 4 is a side view when the first member illustrated in FIG. 3 is viewed from an A1 direction.
Figure 5:
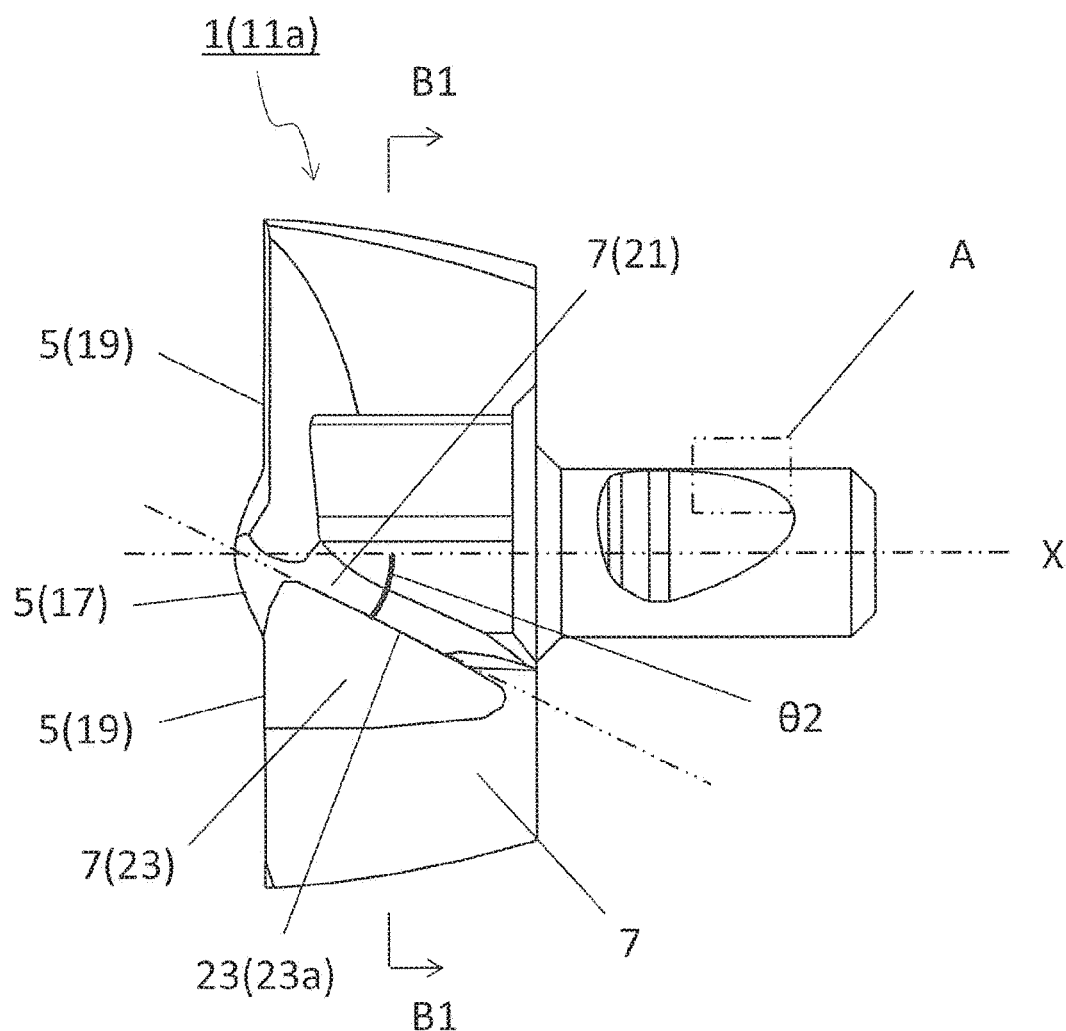
FIG. 5 is a side view when the first member illustrated in FIG. 3 is viewed from an A2 direction.

The through angle θ1 of the first thinning portion 21 relative to the rotation axis X may be relatively small in the drill 1 in a non-limiting aspect illustrated in FIGS. 4 and 5. Chips flowing through the first thinning portion 21 may be less likely to flow to a side of the outer periphery of the body 3 but may tend to flow to a side of the rear end thereof. This may lead to enhanced surface accuracy of a machined surface.

In the drill 1 in a non-limiting aspect illustrated in FIGS. 4 and 5, the through angle θ2 of the second thinning portion 23 relative to the rotation axis X may be greater than the through angle θ1 of the first thinning portion 21. Because the second cutting edge 19 may be located closer to a side of the outer periphery than the first cutting edge 17, a cutting speed of the second cutting edge 19 may be higher than a cutting speed of the first cutting edge 17 during the cutting process. A chip flow occurred on the second cutting edge 19 may be faster than a chip flow occurred on the first cutting edge 17 and may be therefore less susceptible to the influence of the through angle of the thinning part and chips tend to flow in a direction orthogonal to the cutting edge 5. Therefore, the machined surface may be less likely to be damaged even in the case of a large through angle θ2 of the second thinning portion 23 relative to the rotation axis X. Here, the cutting speed (v) can be indicated by π×D (drill diameter)×n (rotation speed).

In case, the through angle θ2 of the second thinning portion 23 is greater than the through angle θ1 of the first thinning portion 21, a web thickness of the body 3 can be made greater. The body 3 may be therefore less likely to be broken, thereby enhancing durability of the body 3.

No particular limitations may be placed on shape of the flute 7 in so far as it extends spirally. The flute 7 may have a circular arc shape whose curvature is approximately constant except for the first thinning portion 21 and the second thinning portion 23 when the flute 7 is viewed in a cross section orthogonal to the rotation axis X.

Figure 8:
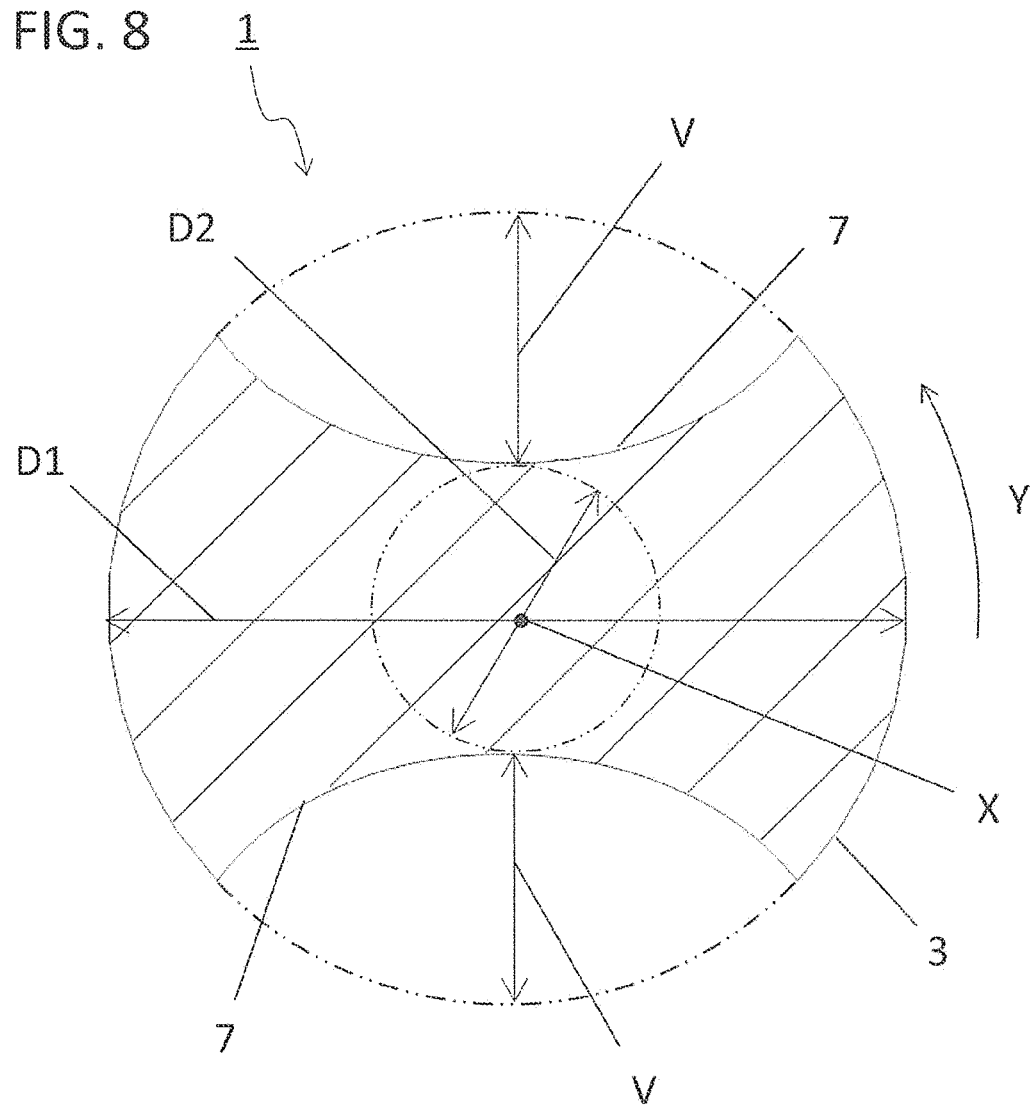
FIG. 8 is a sectional view taken along line B2-B2 in the cutting tool illustrated in FIG. 7.

A depth V of the flute 7 may be set to approximately 10-40% of the outer diameter of the cutting part 11. Here, the depth V of the flute 7 may denote a value obtained by subtracting a distance between a bottom of the flute 7 and the rotation axis X from a radius of the body 3 in a cross section orthogonal to the rotation axis X as illustrated in FIG. 8. The bottom may denote a part of the flute 7 which is closest to the rotation axis X.

Accordingly, a diameter of a web thickness indicated by a diameter D2 of an incircle in the cross section orthogonal to the rotation axis X in the body 3 may be set to approximately 20-80% of an outer diameter D1 of the cutting part 11. Specifically, the depth V of the flute 7 may be settable to, for example, approximately 2-8 mm if the outer diameter D1 of the cutting part 11 is 20 mm.

The first thinning portion 21 and the second thinning portion 23 may extend from the cutting edge 5 toward a side of the rear end. In case, the first thinning portion 21 extends closer to the side of the rear end than the second thinning portion 23, it is possible to stably discharge chips toward the side of the rear end. This makes it possible to further enhance the durability of the body 3 while further enhancing the surface accuracy of the machined surface. The phrase that the first thinning portion 21 extends closer to the side of the rear end than the second thinning portion 23 may be rephrased that a rear end of the first thinning portion 21 is located closer to the side of the rear end in the body 3 than a rear end of the second thinning portion 23.

Although the second thinning portion 23 may extend from the second cutting edge 19 to the outer peripheral surface of the body 3, the second thinning portion 23 in a non-limiting aspect illustrated in FIG. 2 is located apart from the outer peripheral surface of the body 3. In case, the second thinning portion 23 is located apart from the outer peripheral surface of the body 3, it is possible to reduce resistance occurred upon biting, thus leading to improved surface accuracy of the machined surface.

Although a chip flow occurred on the second cutting edge 19 is less susceptible to influence of the through angle θ2 of the second thinning portion 23, it does not mean that the chip flow is not subjected to the influence. In case, the second thinning portion 23 is located apart from the outer peripheral surface of the body 3, chips flowing through the second thinning portion 23 are less likely to fly out from the outer peripheral surface of the body 3 even if the chips flow along the second thinning portion 23. The machined surface is therefore less likely to be damaged, and chip discharge performance can be enhanced.

In the above case, if the first thinning portion 21 extends closer to the outer peripheral surface than the second thinning portion 23 in a front view, a flow direction of chips having a low flow speed may be stably controllable on the first thinning portion 21.

Figure 3:
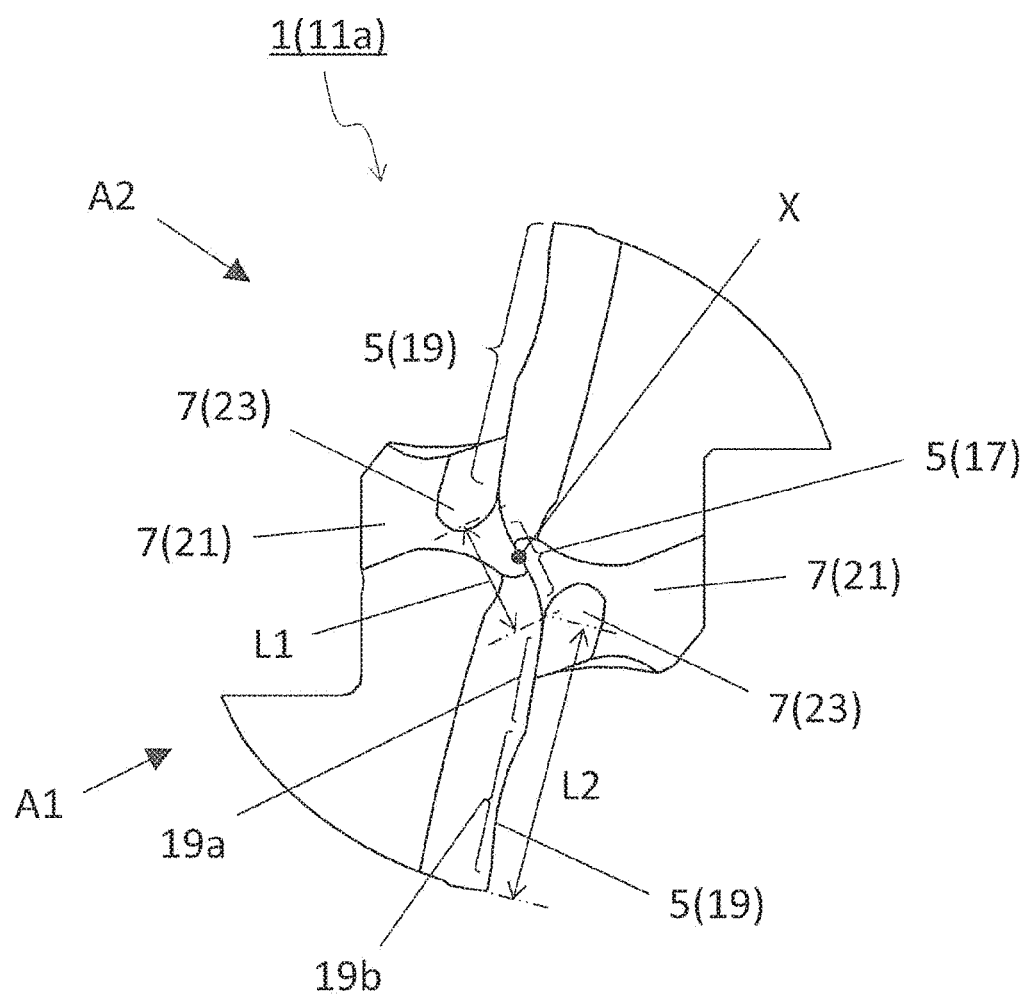
FIG. 3 is a front view in a first end of the first member illustrated in FIG. 2.

In a non-limiting aspect illustrated in FIG. 3, the second cutting edge 19 may include a first portion 19a having a straight line-shape, continuous with the first cutting edge 17 and a second portion 19b located at a side closer to the outer peripheral surface than the first portion 19a in a front view. In case, the second cutting edge 19 includes the first portion 19a having a straight line-shape, chips generated by the first cutting edge 17 may tend to flow integrally with chips generated by the second cutting edge 19, thereby improving chip discharge performance. Similarly to the first portion 19a, the second portion 19b may have a straight line shape. Alternatively, the second portion 19b may have a concave curvilinear shape as in a non-limiting aspect illustrated in FIG. 3. In case, the second portion 19b has the concave curvilinear shape, cutting resistance on the second cutting edge 19 may be less likely to increase sharply.

The second thinning portion 23 may be located continuously with the first portion 19a, and chips generated by the first portion 19a may tend to flow along the second thinning portion 23. Because the first portion 19a is continuous with the first cutting edge 17, chips generated by the first cutting edge 17 may be coupled to the chips generated by the first portion 19a. In case, the chips generated by the first portion 19a tend to flow along the second thinning portion 23, the chips generated by the first cutting edge 17 may tend to be pulled by the chips generated by the first portion 19a, thus leading to improved chip discharge performance.

The cutting edge 5 in a non-limiting aspect illustrated in FIG. 3 may include the first cutting edge 17 and the second cutting edge 19. No particular limitations may be placed on a length L1 of the first cutting edge 17 and a length L2 of the second cutting edge 19. In a non-limiting aspect illustrated in FIG. 3, the length L2 of the second cutting edge 19 may be greater than the length L1 of the first cutting edge 17 in a front view.

No particular limitations may be placed on a width W1 of the first thinning portion 21 in a direction orthogonal to the rotation axis X and a width W2 of the second thinning portion 23 in a direction orthogonal to the rotation axis X in a cross section orthogonal to the rotation axis X. In a non-limiting aspect illustrated in FIG. 6, the width W2 may be greater than the width W1 in the cross section orthogonal to the rotation axis X. In case, the first thinning portion 21 and the second thinning portion 23 may be configured as described above, cutting performance can be enhanced without excessively reducing the durability of the body 3.

Alternatively, the first thinning portion 21 may intersect with and the second thinning portion 23. In other words, a ridge line may be formed on a boundary between the first thinning portion 21 and the second thinning portion 23. In case, the first thinning portion 21 intersects with the second thinning portion 23 at an obtuse angle in the cross section orthogonal to the rotation axis X as in a non-limiting aspect illustrated in FIG. 6, a crack may be less likely to occur between chips flowing along the first thinning portion 21 and chips flowing along the second thinning portion 23. This makes it easier for these chips to flow integrally. Although no particular limitations may be placed on an angle at which the first thinning part 21 intersects with the second thinning portion 23 in the cross section orthogonal to the rotation axis X, the angle may be set to, for example, 120-170°.

<Method of Manufacturing Machined Product>

A method of manufacturing a machined product in a non-limiting aspect may be described in detail below by exemplifying the case of using the drill 1 in one of the above non-limiting aspects. The method may be described below with reference to FIGS. 9 to 11. The machine tool designed to hold the holding part may be omitted in FIGS. 9 to 11.

The method of manufacturing a machined product in a non-limiting aspect may include the following steps (1) to (4).

Figure 9:
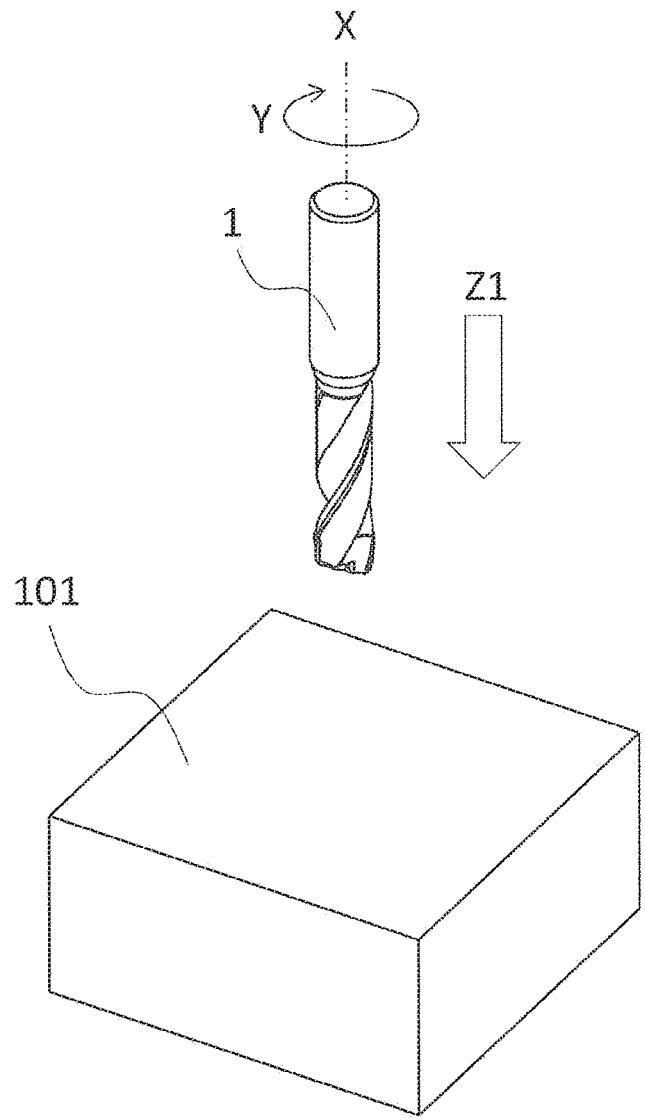
FIG. 9 is a perspective view illustrating a step in a method of manufacturing a machined product in a non-limiting aspect.

The step (1) may be to dispose the drill 1 above a prepared workpiece 101 (refer to FIG. 9).

Figure 10:
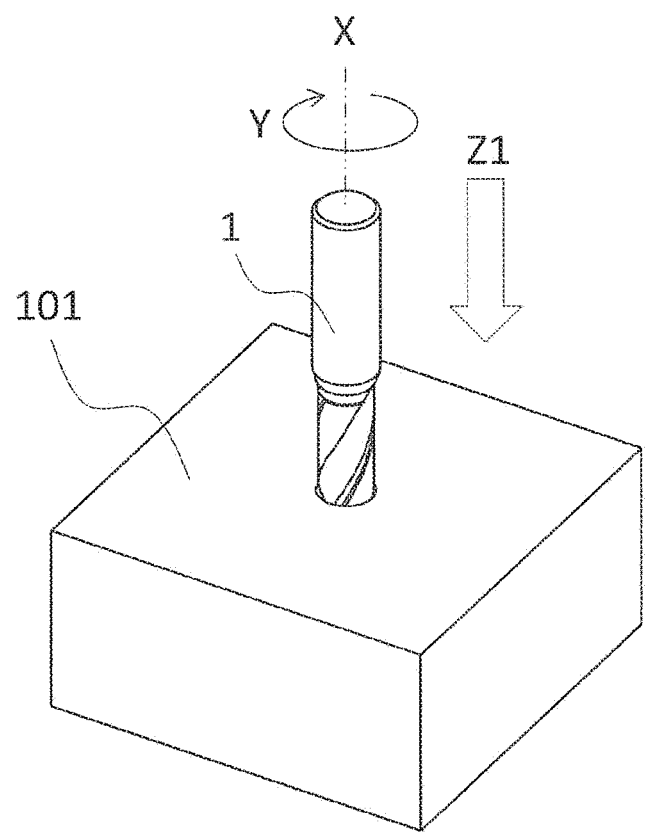
FIG. 10 is a perspective view illustrating a step in the method of manufacturing a machined product in a non-limiting aspect.

The step (2) may be to bring the drill 1 near the workpiece 101 in a Z1 direction by rotating the drill 1 in an arrow Y direction about the rotation axis X (refer to FIGS. 9 and 10).

This step may be carried out, for example, by fixing the workpiece 101 onto a table of a machine tool to which the drill 1 is attached, and then by bringing the drill 1 being rotated near the workpiece 101. In this step, the workpiece 101 and the drill 1 may be brought near each other. For example, the workpiece 101 may be brought near the drill 1.

The step (3) is to form a drilled hole 103 (through hole) in the workpiece 101 by bringing the drill 1 nearer the workpiece 101 so that the cutting edge of the drill 1 being rotated comes into contact with a desired position on a surface of the workpiece 101 (refer to FIG. 10).

In this step, a setting may be made to ensure that the entirety of the cutting part of the drill 1 passes through the workpiece 101, or alternatively a partial region at a side of the rear end of the cutting part of the drill 1 does not pass through the workpiece 101. In case, the setting may be made to ensure that the partial region at the side of the rear end of the cutting part of the drill does not pass through the workpiece 101, a good machined surface is obtainable. Specifically, by making the partial region function as a chip discharge region, excellent chip discharge performance may be attainable via the partial region.

Figure 11:
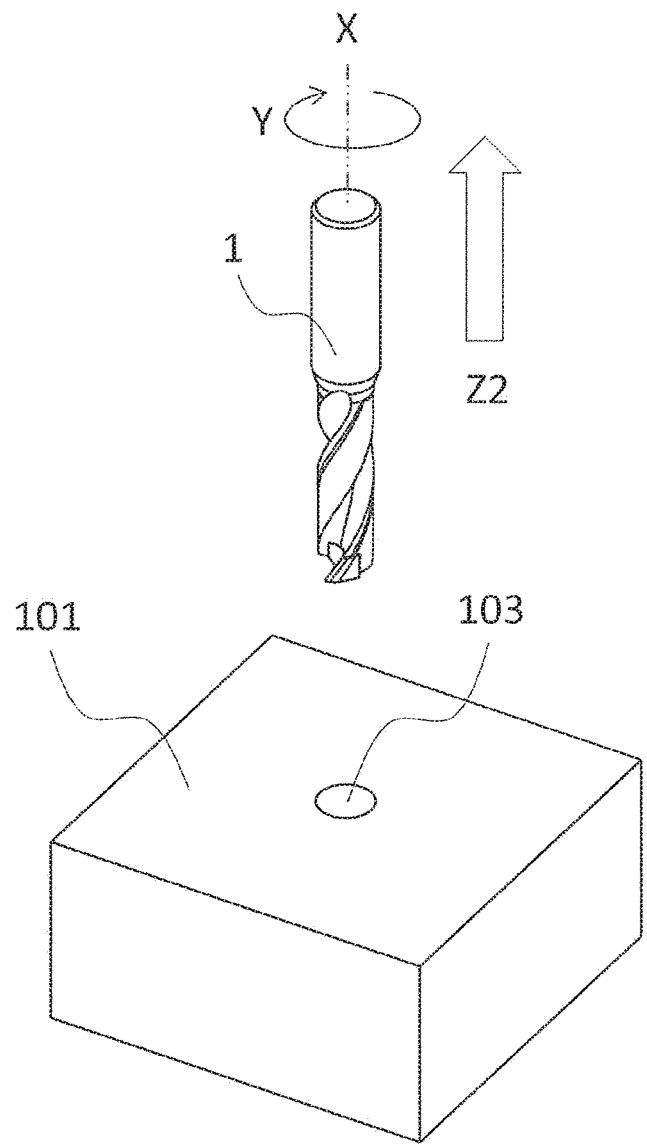
FIG. 11 is a perspective view illustrating a step in the method of manufacturing a machined product in a non-limiting aspect.

The step (4) may be to move the drill 1 away from the workpiece 101 in a Z2 direction (refer to FIG. 11).

Also in this step, the workpiece 101 and the drill 1 may be kept away from each other as is the case with the above step (2). For example, the workpiece 101 may be moved away from the drill 1.

The machined product with the drilled hole 103 may be obtainable through the foregoing steps.

In case, the cutting process of the workpiece 101 as described above is carried out a plurality of times, specifically, for example, if a plurality of drilled holes 103 are formed in the single workpiece 101, it may be necessary to repeat the step of bringing the cutting edge of the drill 1 into contact with different portions of the workpiece 101 while keeping the drill 1 rotating.

While the cutting tools 1 in non-limiting aspects have been described and illustrated above, the cutting tools of the present disclosure are not limited to the above aspects. It is, of course, possible to make any arbitrary ones insofar as they do not depart from the gist of the present disclosure. For example, even though the cutting tool in a non-limiting aspect is the drill 1, there is no problem even if the cutting tool may be an end mill to which the gist of the present disclosure is applied.

DESCRIPTION OF THE REFERENCE NUMERALS 1 cutting tool (drill)
3 body
5 cutting edge
7 flute
9 holding part
11 cutting part
11a first member
11b second member
13 clearance
15 margin
17 first cutting edge
19 second cutting edge
21 first thinning portion
23 second thinning portion
101 workpiece
103 drilled hole

What is claimed is:

1. A cutting tool, comprising:
a body having a bar-shape, extending from a first end to a second end, and comprising a rotation axis and a peripheral surface;
a cutting edge located at the first end; and
a flute spirally extending from the cutting edge toward a side of the second end,
wherein
the cutting edge comprises:
a first cutting edge intersecting with the rotation axis in a front view; and
a second cutting edge extending from the first cutting edge toward the outer peripheral surface,
the flute comprises:
a first thinning portion in connection with the first cutting edge and having a first thinning angle; and
a second thinning portion in connection with the second cutting edge and having a second thinning angle, and
the first thinning angle is smaller than the second thinning angle.

2. The cutting tool according to claim 1, wherein the first thinning portion extends closer to the second end than the second thinning portion.

3. The cutting tool according to claim 1, wherein the second thinning portion is located apart from the outer peripheral surface.

4. The cutting tool according to claim 3, wherein
the first thinning portion extends closer to the outer peripheral surface than the second thinning portion in the front view.

5. The cutting tool according to claim 1, wherein
the second cutting edge comprises a first portion having a straight line-shape and in connection with the first cutting edge and a second portion located closer to the outer peripheral surface than the first portion in the front view, and
the second thinning portion is in connection with the first portion and located apart from the second portion.

6. The cutting tool according to claim 1, wherein
the second cutting edge is longer than the first cutting edge in the front view, and
a width of the second thinning portion in a direction orthogonal to the rotation axis is greater than a width of the first thinning portion in a direction orthogonal to the rotation axis in a cross section orthogonal to the rotation axis.

7. The cutting tool according to claim 1, wherein
the first thinning portion intersects with the second thinning portion forming a ridge line and the ridge line intersects with a cross section orthogonal to the rotation axis at an obtuse angle.

8. A method of manufacturing a machined product, comprising:
rotating a cutting tool according to claim 1;
causing the cutting tool being rotated to come into contact with a workpiece; and
moving the cutting tool away from the workpiece.

\* \* \* \* \*